United States Patent
Mitchell (10) Patent No.: US 7,310,843 B1
(45) Date of Patent: Dec. 25, 2007

(54) LOADING RAMP FOR STANDARDIZED INTERMODAL FREIGHT CONTAINERS

(75) Inventor: Donald J. Mitchell, Wellsburg, WV (US)

(73) Assignee: Eagle Manufacturing Company, Wellsburg, WV (US)

( * ) Notice: Subject to any disclaimer, the term of this patent is extended or adjusted under 35 U.S.C. 154(b) by 0 days.

(21) Appl. No.: 11/433,802

(22) Filed: May 12, 2006

(51) Int. Cl.
*E01D 1/00* (2006.01)

(52) U.S. Cl. ...................................... 14/69.5

(58) Field of Classification Search ............... 14/69.5; 114/230.14
See application file for complete search history.

(56) References Cited

U.S. PATENT DOCUMENTS

| | | | | |
|---|---|---|---|---|
| 308,200 A * | 11/1884 | Rowe | ........................ | 414/537 |
| 408,805 A * | 8/1889 | Kent et al. | .................... | 14/71.1 |
| 686,490 A * | 11/1901 | Uphoff | ........................ | 14/69.5 |
| 963,918 A * | 7/1910 | Miller | ......................... | 14/69.5 |
| 1,131,783 A * | 3/1915 | Howard | ...................... | 14/69.5 |
| 1,139,240 A * | 5/1915 | Viche | .......................... | 14/69.5 |
| 1,628,809 A * | 5/1927 | Sandstrom | .................. | 14/69.5 |
| 2,452,222 A * | 10/1948 | Bryson | ........................ | 14/69.5 |
| 2,559,712 A | 7/1951 | Dobbs | ......................... | 193/41 |
| 3,307,719 A | 3/1967 | Martin, Jr. | ................... | 214/85 |
| 4,657,233 A | 4/1987 | Vroom | ....................... | 267/155 |
| 4,721,426 A | 1/1988 | Bell et al. | .................... | 414/340 |
| 5,035,565 A * | 7/1991 | White | ........................ | 414/537 |
| 5,273,335 A | 12/1993 | Belnap et al. | ................ | 296/61 |
| 5,483,715 A * | 1/1996 | Fogarty et al. | .............. | 14/69.5 |
| 5,608,937 A * | 3/1997 | Seigneur et al. | ............ | 14/69.5 |
| 5,639,174 A * | 6/1997 | Gonska | ....................... | 403/103 |
| 6,076,215 A | 6/2000 | Blankenship et al. | ........ | 14/71.1 |
| 6,349,656 B1 * | 2/2002 | Mitchell | .................. | 108/57.13 |
| 6,575,516 B2 * | 6/2003 | Webber | ....................... | 296/61 |
| 6,745,422 B1 * | 6/2004 | Emerson, Jr. | ............... | 14/69.5 |
| 6,928,959 B1 * | 8/2005 | Trauernicht et al. | ......... | 119/847 |
| 7,100,231 B2 * | 9/2006 | Peschmann | ................. | 14/69.5 |

* cited by examiner

*Primary Examiner*—Raymond W Addie
(74) *Attorney, Agent, or Firm*—Kratz, Quintos & Hanson, LLP (57) ABSTRACT

A ramp for use in bridging from a floor of an ISO standardized intermodal freight container to a placement pad on which the container is placed. An upper lip of the ramp is configured to engage with lower locking lugs of the container, which, although they are not covered by the standard, are found on most containers to be of similar design and located at substantially the same location on each container. The engaged upper lip of the ramp prevents movement of the ramp away from the container and in sideward directions to provide a safe surface for use by workers and equipment when loading or unloading the container.

9 Claims, 9 Drawing Sheets

LOADING RAMP FOR STANDARDIZED INTERMODAL FREIGHT CONTAINERS

FIELD OF THE INVENTION

The present invention is concerned with facilitating the loading and unloading of freight being shipped in a standardized intermodal freight container.

BACKGROUND OF THE INVENTION

Movement of freight throughout the world is facilitated by the use of standardized intermodal freight containers. The containers are built to have standardized dimensions as specified in ISO 668, by the International Organization for Standards. ISO is a worldwide federation of national standards bodies. In having freight containers of a standard size, all major modes of transportation have equipment available that is designed to easily handle the standardized containers. Modes of transportation that handle the standardized containers include ships, trains, airplanes, and trucks. For example, a standardized container might be loaded with product at a manufacturer in a foreign country, transported by truck to a seaport, transported by ship to a domestic seaport, transported by train to a freight yard, and finally transported by truck to a central warehouse of the receiver. Or, for example, a final destination might be a large retail outlet in a shopping center or a manufacturing plant.

Although many manufacturing operations, warehouses, large retail outlets, etc. are equipped with docking facilities designed to efficiently handle the standardized containers, others may not be so equipped, or during high volume periods sufficient docking areas at the well equipped facilitates may not be available.

In order to best make use of over-the-road trucking equipment, a practice is often carried out in which the standardized container is off loaded from the trailer of a truck to a dock area or placed on a preferably paved lot or placement pad for loading or unloading by the shipper or receiver, over a period of time. Such practice enables the truck and driver to proceed with additional deliveries in an efficient manner. The shipper or receiver is then able to load or unload the container at a time most convenient to the shipper or receiver. Unloading typically is carried out with the use of a forklift or the like, or hand trucks when the contents of the container are of a size and weight to be so handled.

When a standardized container is placed on a placement pad or the like for loading or unloading, as described above, there is a problem that the inside floor of the container is at a level above the surface of the pad on which the container is placed. The difference in height is typically 5-7 inches.

It is common practice to use a dock plate or even a sheet of plywood to bridge this height difference, however such method can be a safety issue. With use of a plate, it typically is not restrained from moving, and it can easily slip from the edge of the container, possibly causing injury to a worker or damage to the product being handled. Also, unless the dock plate or the like is properly contoured, the edge of the dock plate located inside the standardized container is spaced from the floor of the container, thus resulting in another safety hazard for those using the dock plate while loading and unloading the container.

OBJECT OF THE INVENTION

It is an object of the present invention to provide a device, for use in combination with a standardized intermodal freight container, to bridge from a placement pad to the floor of the standardized container, in order to provide a safe and substantially smooth surface for use in entering and exiting the container during loading and unloading.

SUMMARY OF THE INVENTION

A ramp for use in bridging from a placement pad to a floor of an ISO standardized intermodal freight container placed on the placement pad, has a plate with a substantially rectilinear lower lip for bearing on the placement pad and an opposing substantially rectilinear upper lip for engaging the container. The upper lip includes a contoured surface and a ridge surface extending along the upper lip for bearing on similarly contoured surfaces of a straight lug portion and a T-lug portion of a plurality of lower locking lugs of the container. At least one integral tab is disposed along and protrudes from the contoured surface of the upper lip, for inserting between a gap formed by the straight lug portion and the T-lug portion of one of the lower locking lug of the container of which the upper lip is bearing.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION OF THE INVENTION

Figure 1:
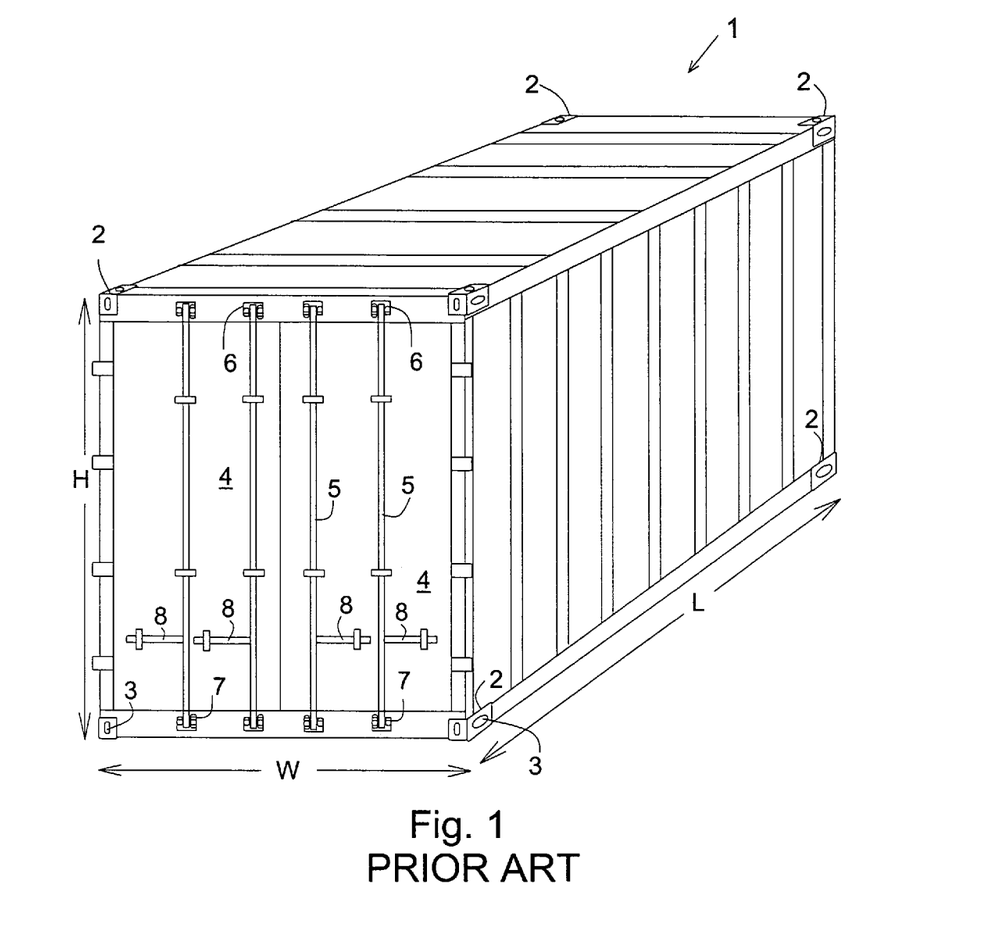
FIG. 1 is an isometric view of a standardized intermodal freight container (ISO 668)

FIG. 1 shows a standardized intermodal freight container 1 having dimensions and load ratings specified by the ISO 668 standard. Throughout the disclosure of the present invention, reference to a container is understood to be in reference to an ISO 668 standardized intermodal freight container.

The ISO standards recite 4 standard external lengths (L) of 40, 30, 20 and 10 feet; 3 standard external heights (H) of 9½, 8½, and 8 feet; and a single standard external width (W) of 8 feet. Also, the spacing between corner fitting 2 and centers of apertures 3 thereof are standard dimensions, as those dimensions are of critical importance when fabricating equipment for handling or securing the containers, as most often the corner fitting are engaged by the handling equipment.

Figure 2:
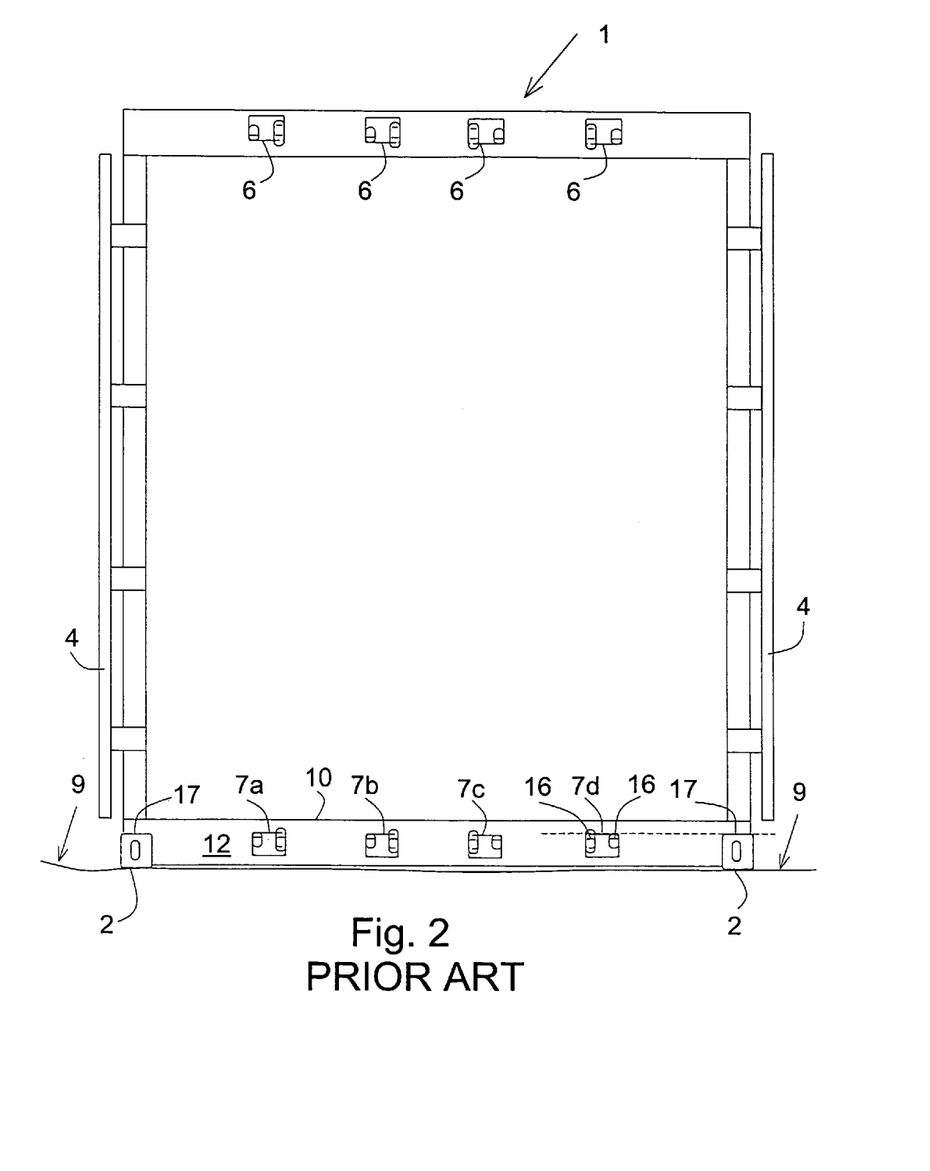
FIG. 2 is an end view of the container of FIG. 1.

Of concern in the present invention is the opening of the container, which in FIG. 1 is closed off by doors 4, having locking rods 5, the ends of which engage in upper locking lugs 6 and lower locking lugs 7 (7a-7d in FIG. 2). The locking rods are actuated with use of locking levers 8. Although the locking lugs 6, 7 and the other locking components are not part of ISO 668 standards, on most containers they are configured as described below.

FIG. 2 shows an end view of a standardized container 1 resting on a placement pad 9, which can be, for example, a floor of a warehouse, a parking lot of a shopping center, a field, or any substantially flat and preferably level surface. In FIG. 2 the container is shown having doors 4 open and secured against the sides of the container, as would most likely be the case when loading or unloading the container. As can clearly be seen the floor 10 of the container is spaced a distance above the placement pad 9 thus creating a step which must be encountered when loading or unloading the container.

The present invention is a ramp, having dimensions for bridging the step between the container floor 10 and the placement pad 9, and restraining means on the ramp configured for engaging at least one of the lower locking lugs 7 of the container. The restraining means restrains movement of the ramp, relative to the container, in directions left and right, forward and rearward, and downward, as viewed from behind the container facing the opening of the container. The only unrestrained direction of movement of the ramp is the upward direction and the weight of the ramp and any load on the ramp, along with gravity, prevents movement in that direction. With use of a ramp having the above-described restraining means, a standardized container can be loaded and unloaded in a safe and efficient manner.

Figure 3A:
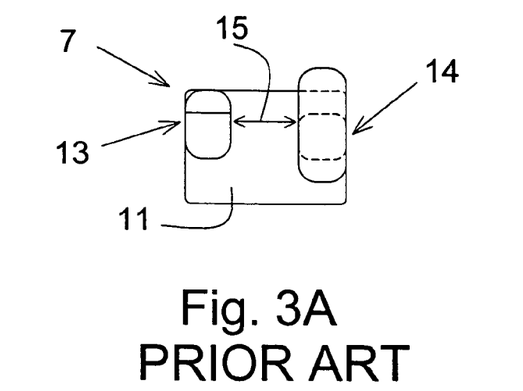
FIG. 3A is a front view of a lower locking lug of a standardized intermodal freight container.
Figure 3B:
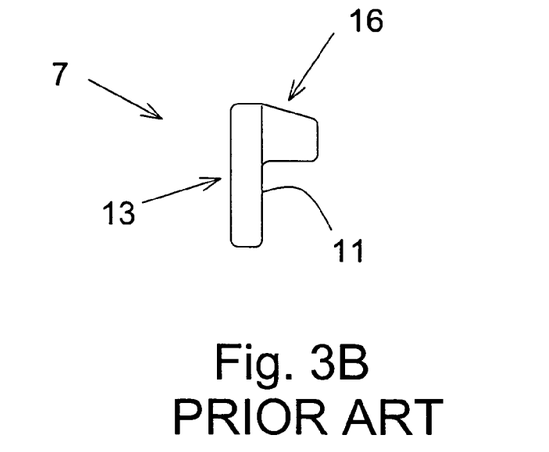
FIG. 3B is a left side view of the lower locking lug of FIG. 3A.
Figure 3C:
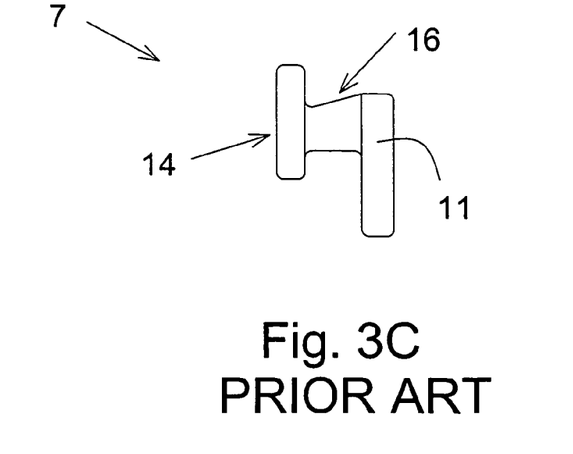
FIG. 3C is a right side view of the lower locking lug of FIG. 3A.

FIGS. 3A-3C show enlarged views of a lower locking lug 7 found on most ISO 668 standard containers. FIG. 3A is a front view, FIG. 3B is a left side view, and FIG. 3C is a right side view, as viewed from the direction mentioned above. In the Figures, 11 indicates a backing plate from which other components of the lower locking lug project. The backing plate 11 is typically welded to a frame surface 12 of the container, as indicated in FIG. 2. The other components of the lower locking lug include straight lug 13 and T-lug 14. The straight lug 13 and T-lug 14 are separated by a gap indicated at 15 in FIG. 3A. The straight lugs and T-lugs both have a similar top surface 16 which is substantially perpendicular to a face of the backing plate at a portion on top of the backing plate and then extends at an angle downward as distance from the backing plate increases. Referring to FIG. 2 the top surfaces 16 of the lugs are typically located at about the same elevation as top ledges 17 of the corner fittings 2, on a container (see dotted line at bottom-right corner).

Figure 4:
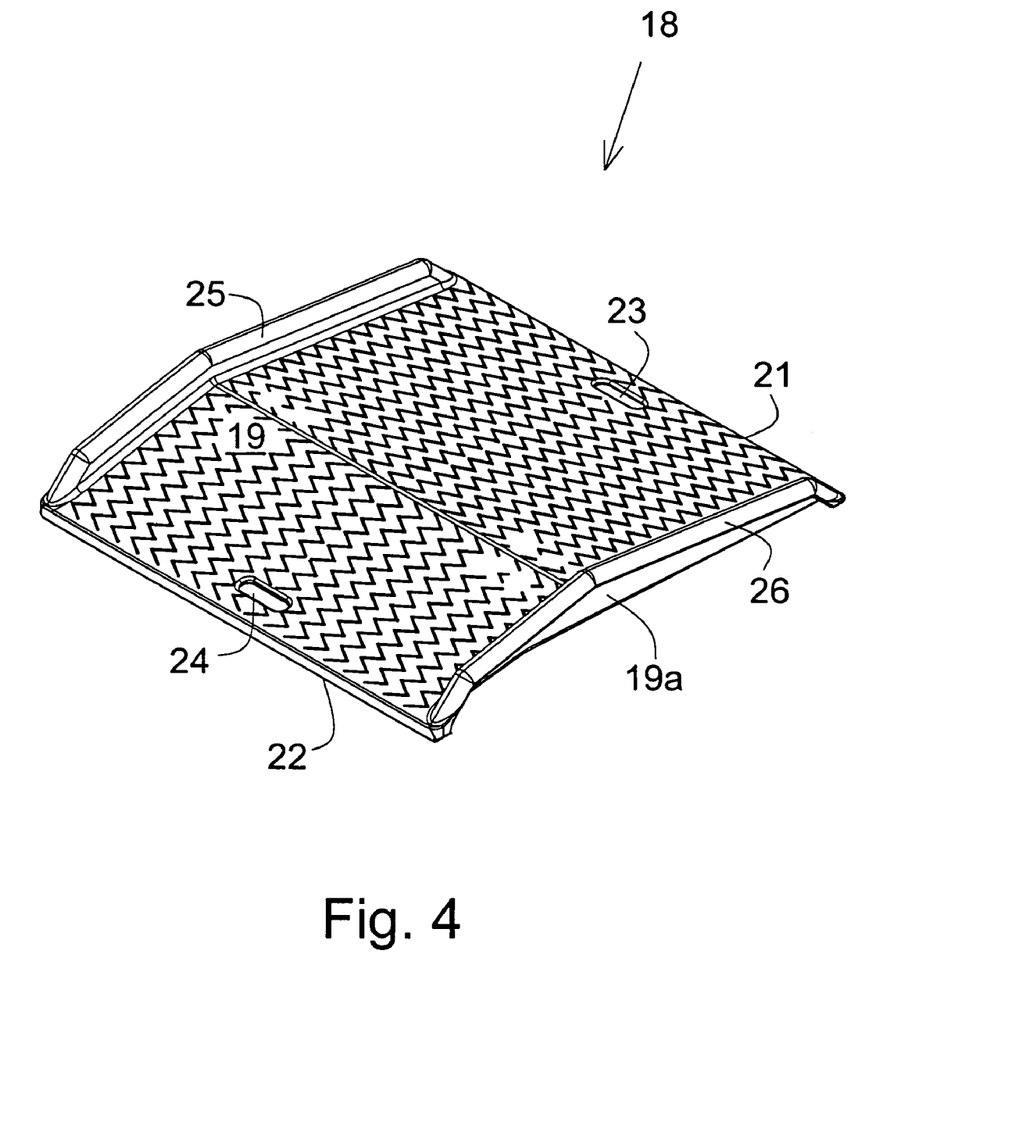
FIG. 4 is an isometric top view of a ramp of the invention.
Figure 5:
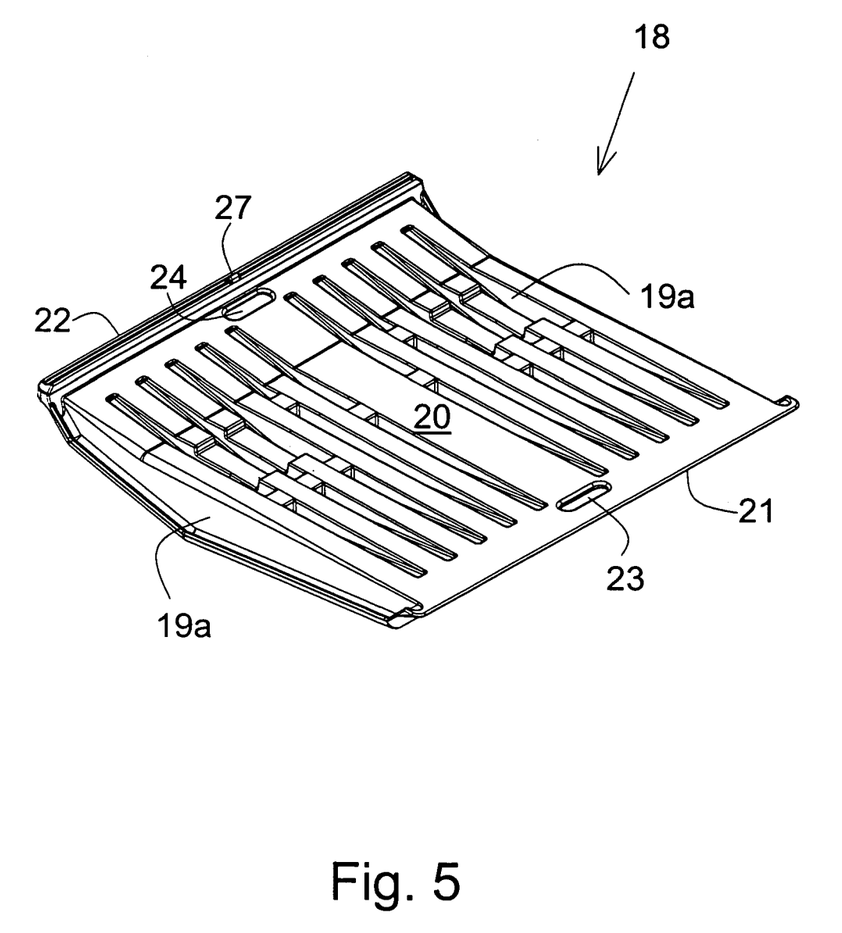
FIG. 5 is an isometric bottom view of the ramp of the invention.
Figure 6:
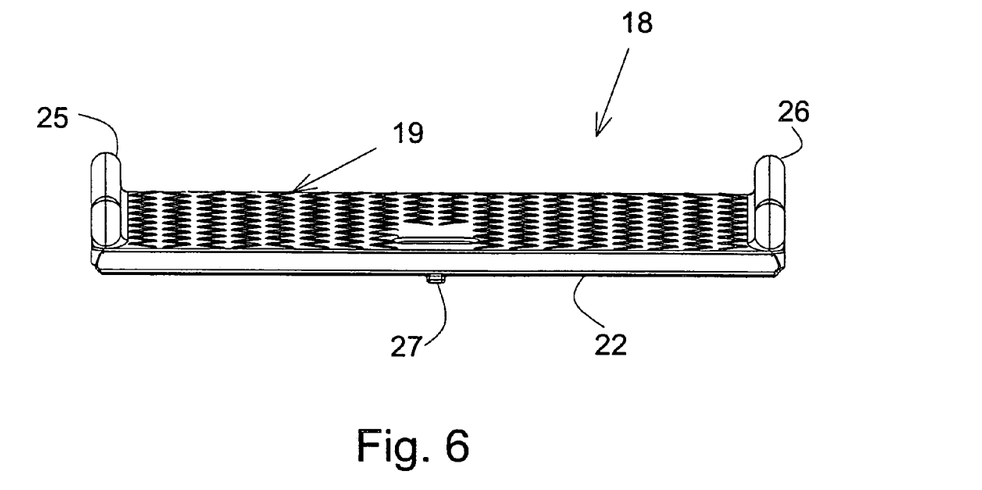
FIG. 6 is an end view of the ramp of the invention.
Figure 7:
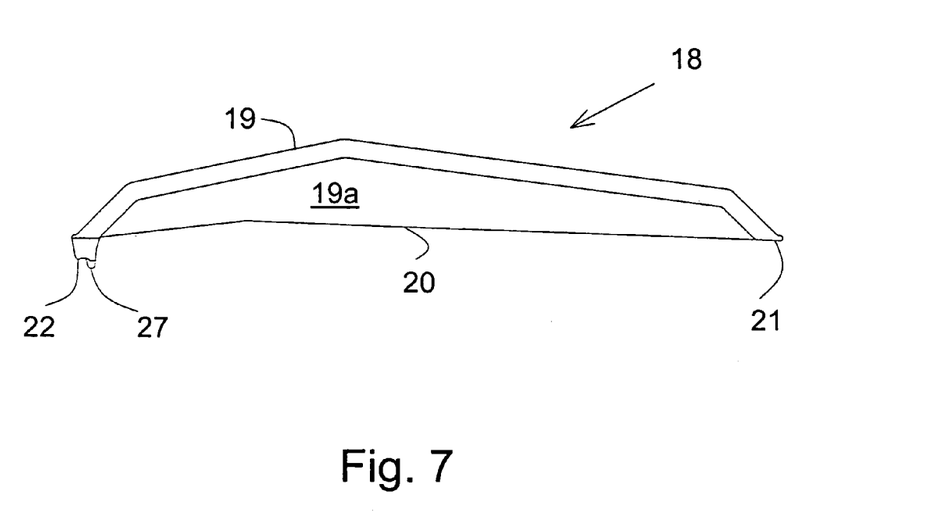
FIG. 7 is a side view of the ramp of the invention.

The ramp of the present invention is configured to engage the above-described lower locking lugs and in some cases a top ledge of a corner fitting. FIGS. 4-7 show various views of a ramp of the invention. FIG. 4 is an isometric top view for showing the general shape of the ramp; FIG. 5 is an isometric bottom view for showing the restraining means of the ramp; FIG. 6 is an end view of the ramp; and FIG. 7 is a side view of the ramp.

Referring to FIGS. 4-7, the ramp 18 includes upper surface plate 19, bottom surface plate 20, lower lip 21 which engages a placement pad on which the container is placed, and upper lip 22 which engages a container. For convenience in moving and positioning the ramp, hand holes 23 and 24 are provided. The top surface plate 19 preferably has formed thereon a raised pattern as a skid-resistance feature and is bowed in the direction of travel between the upper and lower lips. Outward of both sides of the top surface plate 19, side curbs 25 and 26 are provided to help prevent wheels of a hand truck, for example, from traveling off a side of the ramp. Extending downwardly from the top surface plate 19 and extending in the direction of travel between the lower lip 21 and upper lip 22 are reinforcing ribs 19a to add rigidity to the ramp. The upper lip 22 of the ramp also includes at least one integral tab 27 which provides restraint against movement of the ramp in a left or right direction, as described below.

Figure 8:
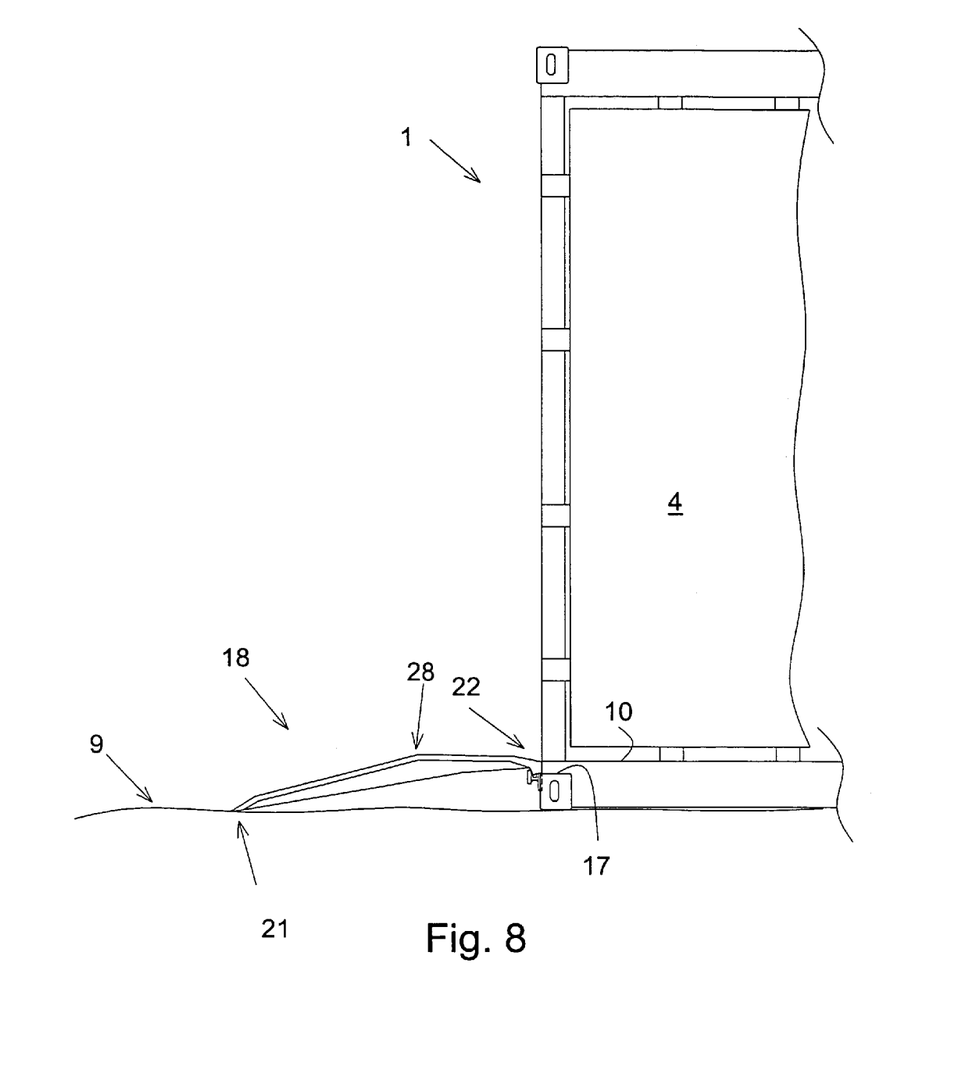
FIG. 8 is a side view of a standardized intermodal container on a placement pad, having the ramp of the invention in place for loading and unloading the container.
Figure 9:
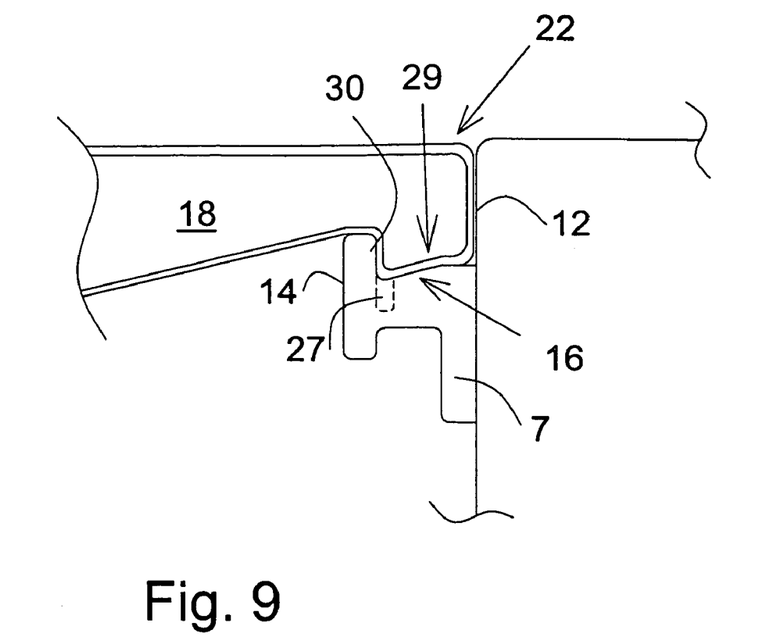
FIG. 9 is an enlarged side view for showing the engagement of the ramp of the invention with a T-lug of a lower locking lug.
Figure 10:
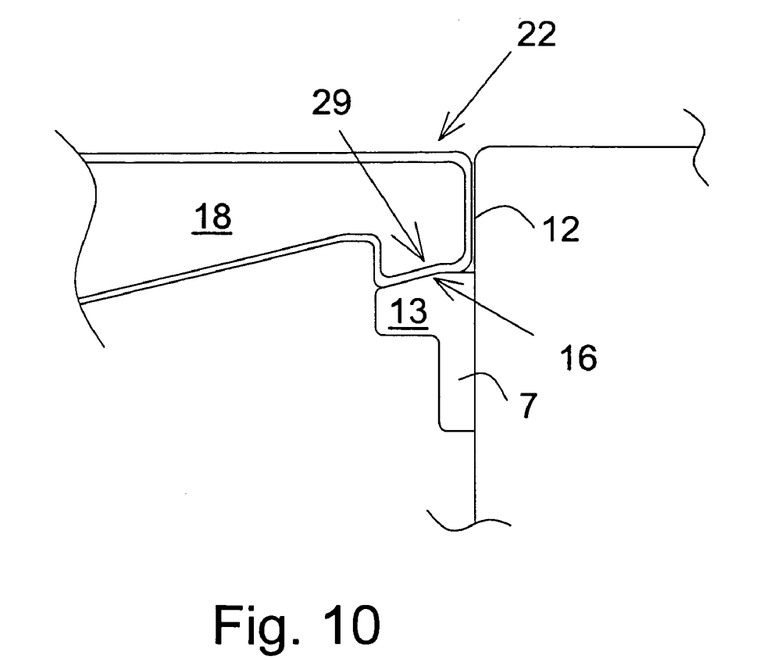
FIG. 10 is an enlarged side view for showing the engagement of the ramp of the invention with a straight lug of a lower locking lug.
Figure 11:
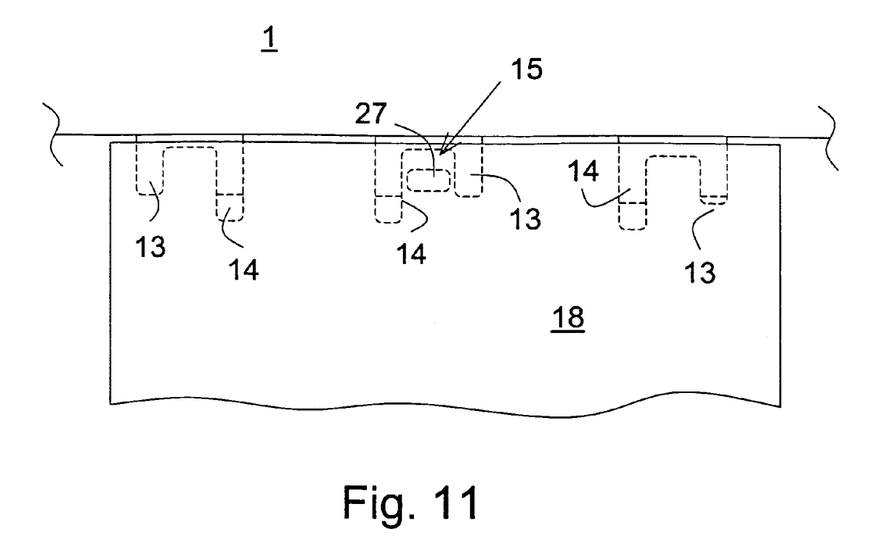
FIG. 11 is an enlarged top view for showing an integral tab of the ramp of the invention as it is disposed between a straight lug and a T-lug of a lower locking lug when the ramp is in place for loading and unloading a container.

FIG. 8 shows a side view of the ramp 18 as positioned at the opening of a container 1, and FIGS. 9-11 are enlarged views of upper lip 22 of the ramp engaged with a lower locking lug 7 of a container 1, for describing details of the ramp of the invention.

In FIGS. 9-11, the straight lug of the locking lug is indicated at 13 and the T-lug of the locking lug is indicated at 14. Ramp upper lip is shown at 22 and the integral tab of the ramp is shown at 27.

Referring to FIG. 8, when a container 1, located on a placement pad 9, is to be loaded or unloaded, a ramp 18 of the invention is positioned as shown. The ramp is preferably contoured as shown at 28 so as to provide a less angular transition from the ramp to the substantially horizontal floor 10 of the container. Lower lip 21 of the ramp is in contact with placement pad 9 and upper lip 22 of the ramp engages at least one lower locking lug of the container, and in some cases a top ledge 17 of a corner fitting 2 of the container. Details of such engagement are shown in enlarged views of FIGS. 9-12.

In FIG. 9, a contoured surface 29 of upper lip 22 of the ramp is preferably contoured to match the contoured top surface 16 of T-lug 14 of a typical lower locking lug 7 of a standardized container. Also, ridge surface 30 is shaped to substantially match an upper inside surface of the T-lug. As is clearly shown, the ramp is restrained from movement away from the container by the T-lug 14, from movement toward the container by container frame surface 12, and from movement downward by the contoured top surface 16 of the T-lug 14. The contoured surface 29 and ridge surface 30 of upper lip 22 of the ramp preferably extend from side to side across the entire lip 22 of the ramp, except for an integral tab portion, which is described in detail below.

In FIG. 10, the contoured surface 29 of upper lip 22 of the ramp is shown as it engages straight lug 13 of a lower locking lug 7. The ramp is restrained from movement downward by the contoured top surface 16 of the straight lug 13 and also restrained from forward movement by the container frame surface 12.

In FIG. 11, the integral tab 27 of the ramp is shown as it is located in gap 15 between straight lug 13 and T-lug 14 of lower locking lug 7. FIG. 11 is a top view of ramp 18 engaged with container 1. As can clearly be seen in FIG. 11, the ramp 18 is restricted from movement to the left or to the right by integral tab 27. Preferably the integral tab 27 extends downward from the contoured surface 29 of upper lip 22 a distance of about 1-3 inches. The integral tab 27, as described above, is best viewed in FIGS. 5-7. As can be seen in FIG. 7, the integral tab preferably is located on a portion of the contoured surface 29 that is toward the lower lip 21. Such placement eliminates any possibility of the integral tab coming in contact with welds or other obstacles which might prevent the ramp from properly seating on the container. Although only one integral tab disposed at about a midpoint of the upper lip is shown in the figures, multiple integral tabs at various locations along the upper lip are possible in the invention.

Referring to FIG. 2, it can be realized that a ramp having a width less then the width of a standardized container might be placed to engage different lower locking lugs. It is preferred that the ramp have a width to enable engagement of the integral tab 27 with one lower locking lug (for example 7b) and to have the contoured surface 29 of the upper lip 22 engage lower locking lugs on each side of the lower locking lug being engaged by the integral tab (for example 7a and 7c). Such width provides stability to the ramp and eliminates the possibility of the ramp tipping when being used.

Figure 12:
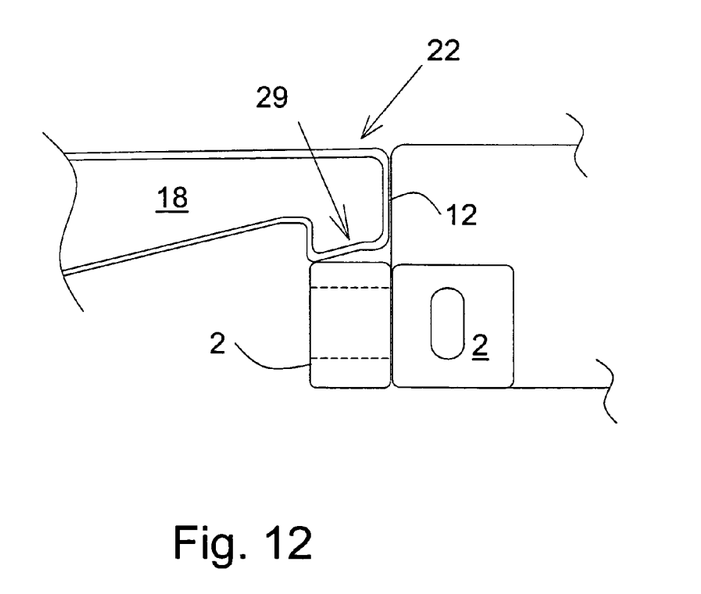
FIG. 12 is an enlarged side view for showing the engagement of the ramp of the invention with a ledge of a corner fitting of a container.

Again referring to FIG. 2, it can be realized that locating the integral tab 27 for engagement with lower locking lug 7a could place the contoured surface 29 of the upper lip 22 in contact with upper ledge 17 of corner fitting 2, as shown in detail in FIG. 12 as well as in engagement with lower locking lug 7b. Although it is not part of ISO standard 668, top ledge 17 of corner fittings 2 is typically found to be substantially in line with the top surfaces 16 of the lower locking lugs 7, as indicated by the dotted line in FIG. 2. Having that arrangement enables the engagement as shown in FIG. 12 and the top ledge 17 restricts movement of the upper lip 22 of the ramp in a downward direction.

The ramp of the invention can be fabricated of any material capable of withstanding the weight of hand trucks and the like which might be used in loading and unloading a container. Preferably the ramp is fabricated of plastic such as high density polyethylene, using a blow-molding production method. Other methods of molding may also be used, such as rotational molding. The ramp may also be made of other materials, such as aluminum, by any fabrication method. It has been found that a ramp having a width of about 36-43 inches and a length of about 48 inches provides an acceptable transition surface from a placement pad to a floor of a container. A ramp of the invention is also possible for use by forklifts, or the like.

While specific materials, dimensional data, etc. have been set forth for purposes of describing embodiments of the invention, various modifications can be resorted to, in light of the above teachings, without departing from applicant's novel contributions; therefore in determining the scope of the present invention, reference shall be made to the appended claims.

What is claimed is:

1. A ramp for use in bridging from a placement pad to a floor of an ISO standardized intermodal freight container placed on the placement pad, comprising
   a plate, molded as a unitary piece, having a substantially rectilinear lower lip arranged to bear on the placement pad and an opposing substantially rectilinear upper lip arranged to engage the container, wherein
   said upper lip includes a contoured surface and a ridge surface extending along the upper lip arranged to bear on similarly contoured surfaces or a straight lug portion and a T-lug portion of a plurality of lower locking lugs of the container, each lower locking lug attached to a backing plate and having a top surface substantially perpendicular to a face of the backing plate and extending at an angle downward as distance from the backing plate increases, and the contoured surface of the upper lip conforming to the top surface of each lower locking lug, and at least one integral tab disposed along and protruding from the contoured surface of said upper lip, arranged to be inserted between the gap formed by the straight lug portion and the T-lug portion of one of the lower locking lugs of the container on which the upper lip is bearing.

2. The ramp of claim 1, further comprising raised curbs along edges of the plate connecting said lower and upper lips.

3. The ramp of claim 1, wherein said plate has formed therein at least one hand hole for facilitating movement of the ramp.

4. The ramp of claim 1, wherein said plate has non-skid raised patterns on an upper surface thereof.

5. The ramp of claim 1, wherein said plate is bowed in a direction of travel between said lower and upper lips, and
   said plate has reinforcing ribs extending downwardly and directed in the direction of travel between said lower and upper lips.

6. The ramp of claim 1, wherein said plate is formed of high density polyethylene.

7. A ramp for use in bridging from a placement pad to a floor of an ISO standardized intermodal freight container placed on the placement pad, comprising
   a high density polyethylene plate, molded as a unitary piece, having a substantially rectilinear lower lip arranged to bear on the placement pad and an opposing substantially rectilinear upper lip arranged to engage the container, and
   raised curbs along edges of the plate connecting said lower and upper lips, wherein
   said upper lip includes a contoured surface and a ridge surface extending along the upper lip arranged to bear on similarly contoured surfaces of a straight lug portion and a T-lug portion of a plurality of lower locking lugs of the container, each lower locking lug attached to a backing plate and having a top surface substantially perpendicular to a face of the backing plate and extending at an angle downward as distance from the backing plate increases, and the contoured surface of the upper lip conforming to the top surface of each lower locking lug, and at least one integral tab disposed along and protruding from the contoured surface of said upper lip, arranged to be inserted between the gap formed by a straight lug portion and the T-lug portion of one of the lower locking lugs of the container on which the upper lip is bearing.

8. The ramp of claim 7, wherein
   said plate has formed therein at least one hand hole for facilitating movement of the ramp, and
   said plate has non-skid raised patterns on an upper surface thereof.

9. The ramp of claim 8, wherein
   said plate is bowed in a direction of travel between said lower and upper lips.

* * * * *